Oct. 28, 1941.          W. T. MARCHMENT                 2,260,913
                   LIQUID LEVEL INDICATING APPARATUS
                        Filed Feb. 6, 1939             4 Sheets-Sheet 1
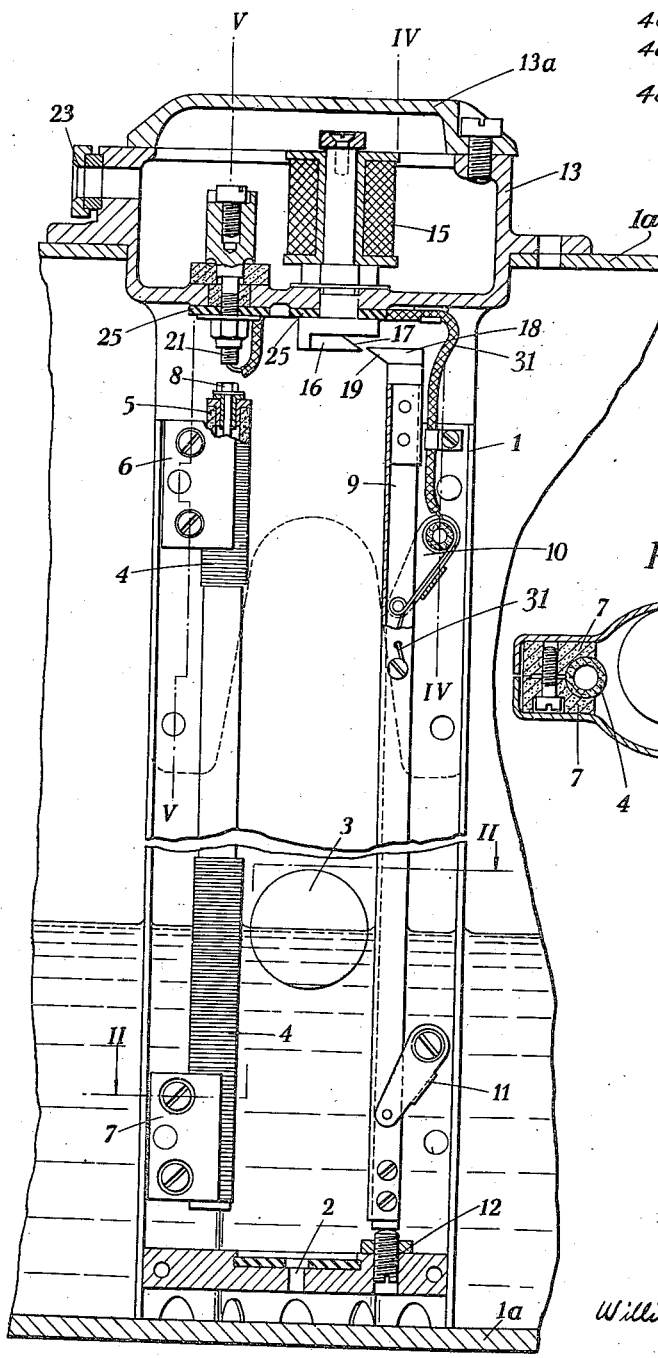
Inventor
William Thomas Marchment
by Ralph B. Stewart
Attorney Oct. 28, 1941.      W. T. MARCHMENT      2,260,913
LIQUID LEVEL INDICATING APPARATUS
Filed Feb. 6, 1939      4 Sheets-Sheet 2

Inventor
William Thomas Marchment
by Ralph B. Stewart
Attorney

Patented Oct. 28, 1941

2,260,913

UNITED STATES PATENT OFFICE 2,260,913

LIQUID LEVEL INDICATING APPARATUS

William Thomas Marchment, Chiswick, London, England, assignor to Evershed & Vignoles Limited, London, England, a British company Application February 6, 1939, Serial No. 254,940
In Great Britain June 23, 1938

14 Claims. (Cl. 73—313)

This invention relates to electrical apparatus for indicating liquid levels, and although it has various applications it is particularly applicable to the fuel tanks of aircraft.

Generally speaking, the arrangements at present in use in aircraft for indicating the level, and consequently the quantity, of petrol or oil in the tanks during flight leave much to be desired both as regards accuracy and reliability of operation, and their defects may well be aggravated by the conditions imposed by the evolutions carried out by a machine in flight. This is especially the case with float-operated mechanical or electrical arrangements, where false indications are liable to result from the float sticking or due to sporadic variation of an electrical resistance caused by variable contact pressures, or due to accidental displacement of the float arm brought about by abrupt movements of a tank.

The present invention aims at providing a liquid level indicating arrangement capable of giving reliable indications when used in aircraft, but which may also be employed in road motor vehicles, on board ship or in storage tanks on land for indicating the level of liquids such as petrol and oil.

Apparatus for indicating the level of liquid in a vessel such as a storage tank comprises, according to the invention, an electrical indicating or measuring instrument connected in circuit with a resistance element, or several interconnected resistance elements; a float arranged to rise and fall freely inside a cage or other guide structure which extends between the highest and lowest liquid levels to be measured, and, at least at its bottom, is open to the liquid; and means for moving the float laterally across the surface of the liquid in the guide structure, when a reading is to be taken, so that the float itself then effects completion of the circuit of the indicating or measuring instrument, the amount of resistance included in the circuit thus being governed by the position of the float, and consequently by the level of the liquid, at the time when a reading is taken. The absence of float-operated rods or levers renders the apparatus extremely compact, and the fact that the apparatus can be constructed so as to lie entirely inside the associated tank is of especial advantage in connection with aircraft where it is desirable to dispense with externally projecting parts as far as possible. The float, which is preferably of spherical shape, may be hollow and made of metal or it may consist of metallised insulating material such as wood or cork. In either of these cases the metal part of the float may form part of the circuit to the indicating or measuring instrument when the float is positively moved sideways in the guide structure, the float then forming an electrical connection between the resistance element or elements and a conducting member which is actuated to press the float laterally into contact with the resistance and is itself connected to the indicating or measuring instrument. It is also possible to use a float consisting entirely of insulating material, and in this event a number of small switch members may be used which are connected to tappings on the resistance element or elements and spaced apart vertically above one another at one side of the guide structure, so that for any given liquid level the float can be moved laterally to effect closing of the corresponding switch member. Owing to the fact that the float is entirely free and is not attached to any kind of rod or lever, its inertia is very small.

Conveniently, the lateral movement of the float, which is necessary in order to obtain a reading, is effected by means of an electromagnetically-operated or mechanically-operated rod-like member, constituting a striker, which extends vertically along one side of the guide structure throughout the range of travel of the float, the resistance element or elements extending vertically along the opposite side of the guide structure. The striker may be pivotally mounted on parallel links secured to the guide structure, in which case the striker is moved upwardly and inwardly about its supporting links in order to effect lateral movement of the float, the movement of the striker being effected either electromagnetically or by means of a cam or Bowden wire. Alternatively, the rod-like striker may be mounted for pivotal movement about a vertical axis, and have a cam-shaped cross-section, or it may be of circular cross-section and pivoted eccentrically. In either of these last two cases, when the rod-like striker is turned about its pivotal axis it exerts a cam action to press the float laterally into engagement with the resistance or one of the switch members as the case may be. The turning movement of the striker may be effected, for example, by means of a solenoid or by a Bowden wire control. Each of the arrangements mentioned ensures that the contact pressure exerted is as nearly as possible uniform throughout the range of operation, and avoids any false indications that might result from variable contact pressures. The rod-like striker is preferably actuated by an electromagnet controlled by a push-button switch, and when it is mounted to turn about a vertical axis it is returned to the inoperative position by means of a spring when the solenoid is de-energised, or when the Bowden wire control is released.

A low-voltage source of current, such as a small secondary battery, is preferably employed so as to avoid any risk of sparking, especially when petrol is the liquid concerned. Although the invention is best suited for use with liquids having electrical insulating properties, it may also be employed with liquids having a slight conductivity, such as water, if suitable precautions are taken to prevent electrolysis and so forth. The indicating or measuring instrument used may be an ordinary voltmeter, ohmmeter or milliammeter or a ratiometer instrument.

A liquid-level indicating apparatus in accordance with the invention and particularly suitable for installation in the petrol or oil tanks of aircraft will now be described, by way of example, with reference to the accompanying drawings, in which:

Figure 1 is an elevation, partly in section, of the part of the apparatus which is fitted in the petrol or oil tank;

Figure 1a is a diagrammatic showing of a modified form of the indicating apparatus;

Figure 2 is a section on the line II—II in Figure 1;

Figure 3:
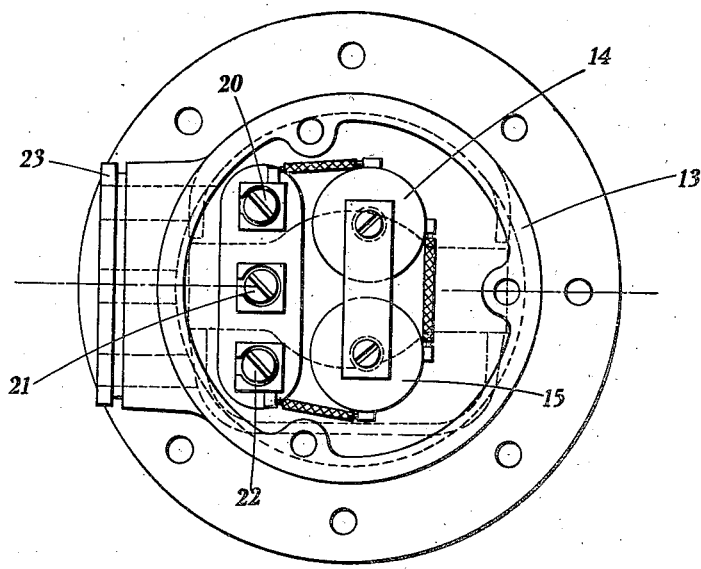
Figure 3 is a plan view of the top of the device shown in Figure 1.
Figure 4:
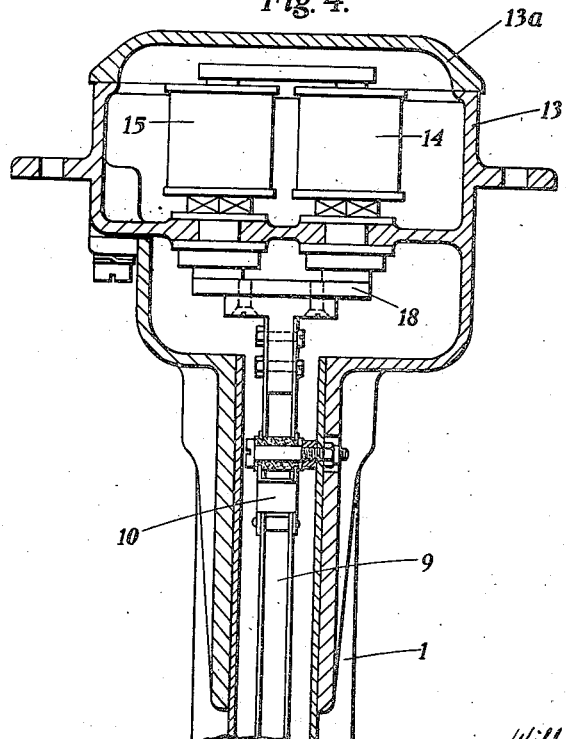
Figure 4 is a section on the line IV—IV in Figure 1.
Figure 5:
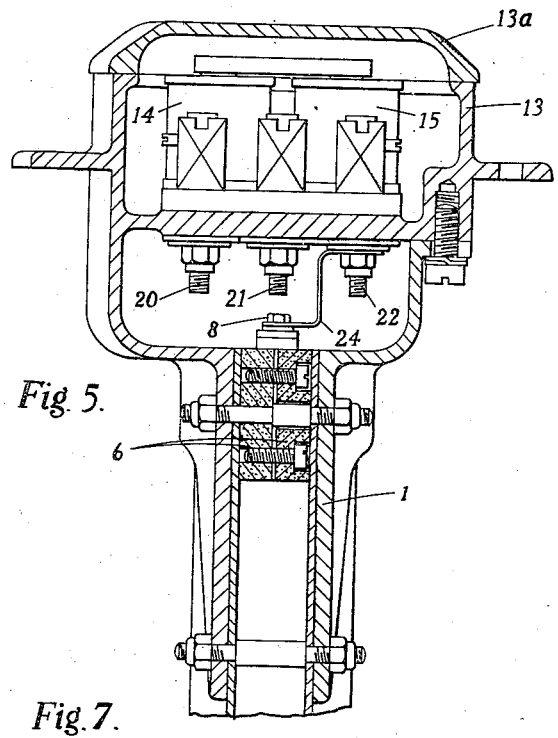
Figure 5 is a section on the line V—V in Figure 1.

The device shown in Figure 1 is arranged to extend vertically between the top and bottom of a tank 1a, such as a petrol tank of an aeroplane, and it comprises a guide structure 1 of elongated cross-section and made in two halves, as shown in Figure 2. At its bottom the guide structure 1 is provided with an opening 2 through which petrol enters so that it stands at the same level inside the guide structure as it does in the tank in which this structure is fitted. The opening 2 is made comparatively small in order to minimise surging of the petrol in the guide structure when the petrol tank is tilted. Inside the guide structure there is a ball float 3 consisting of wood coated with aluminium. The internal surface of the guide structure 1 is coated with insulating enamel and, as is clearly indicated in Figure 2, the ball float 3 is afforded an adequate amount of lateral clearance so that it is entirely free to rise and fall with the level of the petrol in the guide structure.

An electrical resistance element 4, composed of enamelled wire closely wound on a Bakelite tube 5, is disposed vertically along one side of the guide structure 1 between the highest and lowest liquid levels to be indicated, the resistance element being clamped at the top and bottom between insulating blocks 6 and 7. The enamel is rubbed off the wire along one side of the resistance element 4 in order to permit electrical contact with the ball float 3, and the lower end of the resistance element 4 is left free while the upper end is connected to a terminal 8. At the opposite side of the guide structure 1 to that at which the resistance element 4 is located, there is a vertical member 9 of channel-shaped cross-section made of duralumin and pivotally mounted on parallel links 10 and 11, and normally resting on an adjustable screw 12 provided in the base of the guide structure 1. The member 9 constitutes a striker and when it is moved inwardly and upwardly, as allowed by its supporting links 10 and 11 turning in the clockwise direction, it presses the ball float 3 firmly into contact with the bare surface of the resistance element 4 and, in so doing, completes a circuit to an electrical indicating instrument, as will be explained below.

The top of the guide structure 1 is formed with a head 13 fitted with a detachable cover 13a. The head 13 accommodates an electromagnet consisting of two coils 14 and 15 provided with a pole-piece 16 having an inclined surface 17. The top of the striker 9 is fitted with a soft iron armature 18 having an inclined surface 19 which is parallel to the surface 17 and overlaps it slightly, as indicated in Figure 1, when the striker 9 is in its inoperative position.

The head 13 of the device also contains three terminals 20, 21 and 22 and is formed with a cable-entry 23, the terminal 8 of the resistance element 4 being connected by a wire 24 to the terminal 22. A packing member 25 is employed to provide a petrol-tight joint between the interior of the guide structure 1 and the interior of its head 13.

Figure 7:
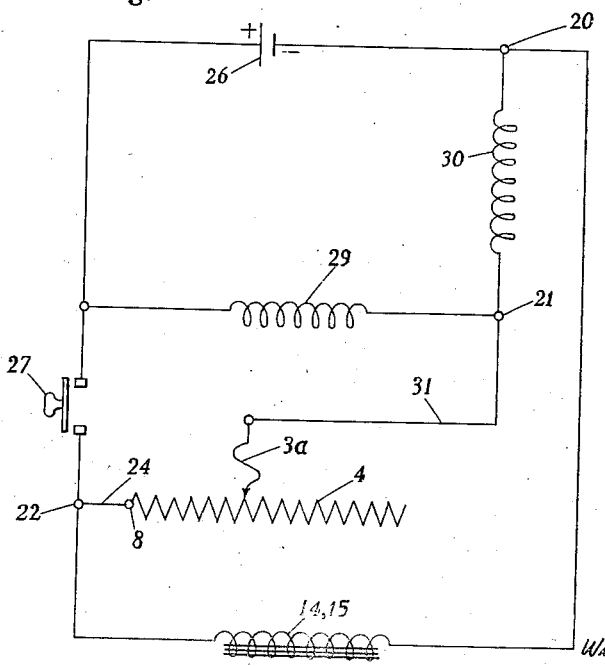
Figure 7 is a circuit diagram corresponding to Figure 6.
Figure 6:
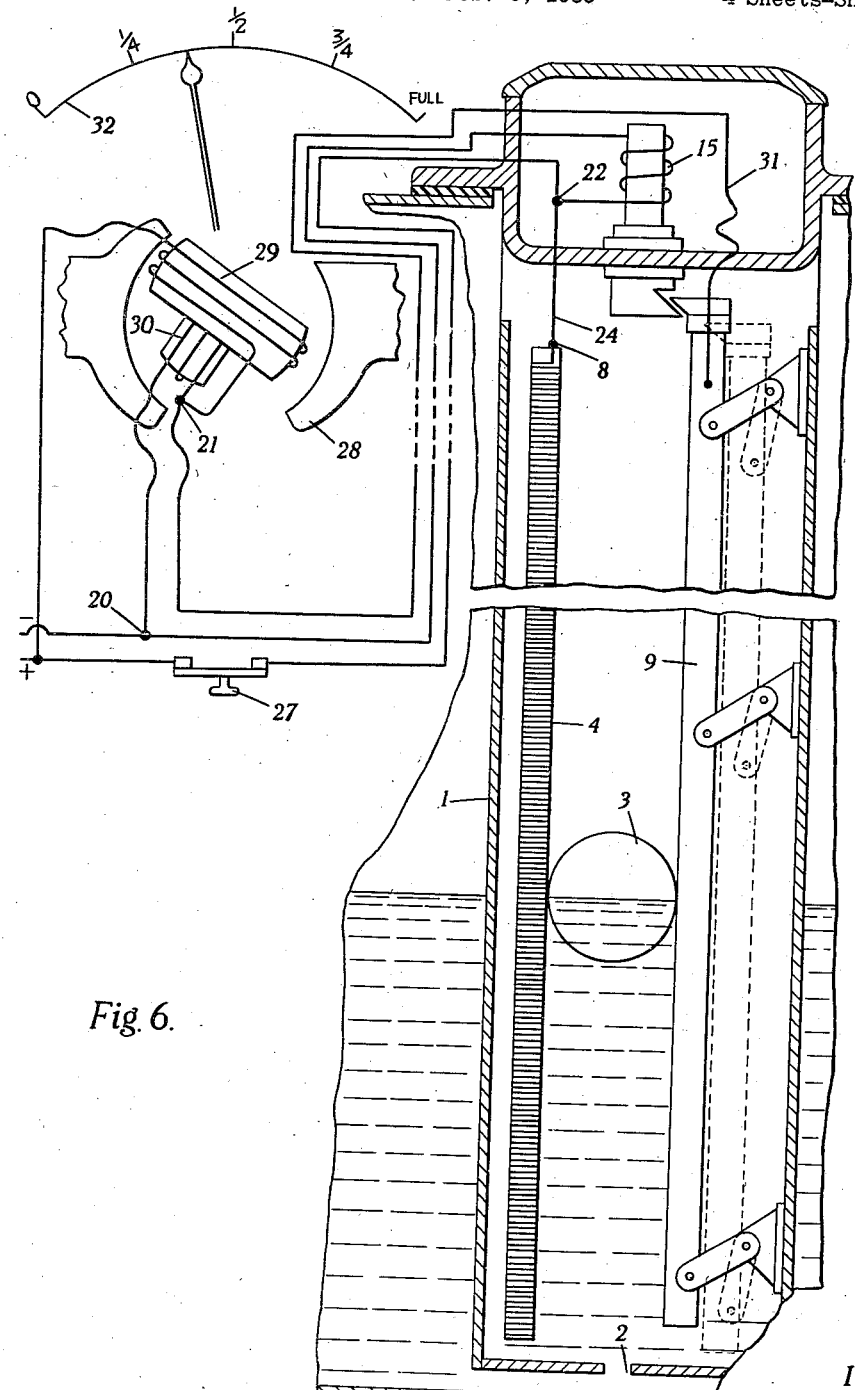
Figure 6 is a diagrammatic view showing the electrical connections of the apparatus.

The electrical connections are as shown in Figures 6 and 7. The coils 14 and 15 of the electromagnet are connected in series with a battery 26 and a push-button switch 27 by way of the terminals 20 and 22. As already mentioned, the terminal 22 is connected by a wire 24 to the terminal 8 which, in turn, is connected to the upper end of the resistance element 4.

An ohmmeter 28 of the cross-coil type has its deflecting coil 29 and its control coil 30 connected as indicated in Figure 7, the control coil 30 being connected in series with the battery 26 and that portion of the resistance element 4 which is tapped off by the metallised ball float 3 when the latter is pressed by the striker 9 into contact with the resistance element 4. The function of the ball float 3 is indicated by the movable contact 3a in Figure 7. It will be observed that the control coil 30 of the ohmmeter is connected to the terminal 21 and this terminal is connected by a wire 31 to the striker 9 which, as already mentioned, is made of duralumin and is, therefore, electrically-conductive.

So long as the push-button switch 27 remains open, no indication is given on the ohmmeter 28, and this is because the coils 14 and 15 of the electromagnet are de-energised, and consequently, the striker 9 is in its lowermost position as indicated in Figure 1 and in dotted lines in Figure 6, and there is no circuit because the metallised ball float 3 is not simultaneously touching the resistance element 4 and the striker 9. When it is desired to take a reading of the petrol level, the switch 27 is closed and the resulting energisation of the coils 14 and 15 of the electromagnet causes the armature 18 to be attracted by the pole-piece 16. As a result, the striker 9 moves upwardly and inwardly about the pivots of its supporting links 10 and 11 until it clamps the ball float 3 against the resistance element 4, as indicated in Figure 6. When the striker 9 is actuated it simply moves the ball 3 laterally across the surface of the petrol in the guide structure 1 and into firm contact with the resistance element 4, and, since there is virtually point contact between the striker 9 and the ball 3, operation of the striker does not produce any rolling of the ball 3 such as would displace it in the vertical direction and give rise to errors in the reading of the petrol level. When the switch 27 is opened, the striker 9 returns by gravity to its inoperative position indicated in dotted lines in Figure 6.

Although the ball float 3 is represented in Figures 1 and 6 as floating half submerged, or in other words the level of the petrol coincides with the horizontal plane passing through the centre of the ball, it is not necessary to observe this condition in practice. The degree of submersion of any given float depends upon the specific gravity of the liquid, but it does not matter to what extent the point of contact between the ball float 3 and the resistance element 4 lies above or below the surface of the liquid so long as the apparatus is calibrated to take account of this. Naturally, if either the float or the particular liquid for which the apparatus has been calibrated is changed, the calibration must be performed again in case the degree of submersion of the float is different. In general, variation of the specific gravity of the liquid due to temperature change will not affect the readings of the liquid level to any material extent, although if desired the apparatus may be calibrated to suit various temperatures.

It will be appreciated that the amount of the resistance element 4 which is included in series with the control coil 30 of the ohmmeter 28 depends upon the vertical height at which the ball float 3 happens to be when it is moved laterally by the striker 9 into contact with the resistance element 4, or in other words, it depends upon the level of the petrol at any time since this governs the vertical position of the ball float 3. The ohmmeter circuit is thus completed through the metal part of the float 3 which itself acts as a switch. The scale 32 of the ohmmeter 28 is calibrated so as to indicate the quantity of petrol in the tank.

The arrangement has the advantage that as the float is entirely free, up to the moment when it is moved laterally to obtain a reading, it cannot possibly stick. Moreover, the degree of immersion of the float remains substantially constant for any given liquid, and a common source of error in other systems is thereby avoided. Another advantage of the present arrangement is that the float, which acts as a transmitter of the level indications, is pressed, whenever a reading is to be taken, with uniform contact pressure against the resistance element 4 throughout the range of operation.

Although in the particular example described above, the resistance element 4 is made up of closely wound enamelled wire, it may equally well be composed of bare wire with the turns spaced apart on the Bakelite tube 5 or other insulating former.

The arrangement illustrated in the drawings may be modified so as to permit the use of a float consisting of a ball made entirely of insulating material, and in this case the single resistance element 4 shown in the drawings is replaced by a number of series-connected resistance elements, shown at 4a, 4b, 4c, etc., in Figure 1a, each of which is fitted with its own switch member in the form of a small plate (plates 4a', 4b', 4c', etc., of Figure 1a) projecting into the interior of the guide structure in the same position as the resistance element 4. The switch plates of the respective resistance elements are spaced apart vertically one above another, and the arrangement is such that when the ball float 3 is moved sideways by the striker 9 to take a reading, it presses against the particular one of the switch plates which happens to be at the level of the liquid and thereby closes the circuit to the ohmmeter or other indicating instrument through the corresponding amount of resistance.

In all cases it is preferable to arrange matters so that when the push-button switch 27 is in the "off" position, it connects the ohmmeter or other indicating instrument in circuit with a standard resistance for the purpose of obtaining a reading on the instrument to show that it is functioning.

I claim:

1. An apparatus for indicating the level of liquid in a container, comprising a hollow guide structure arranged to extend within the container between the highest and lowest levels to be indicated, with at least the lower end of said guide structure open to the liquid in the container, a substantially spherical float located within said guide structure and arranged to rise and fall freely with the liquid level, a source of electrical supply, a resistance path including contact means disposed along the path of travel of said float and providing a plurality of points of electrical contact at spaced points on said resistance path, an electrical indicating instrument arranged to be connected in circuit with said source of supply through at least part of said resistance element, and means for moving said float laterally in said guide structure, when a reading is to be taken, into engagement with said contact means for completion of the circuit of said indicating instrument, the amount of said resistance element which is included in said circuit being governed by the position of said float and consequently by the level of the liquid.

2. An apparatus for indicating the level of liquid in a container, comprising a hollow guide structure arranged to extend within the container between the highest and lowest levels to be indicated, with at least the lower end of said guide structure open to the liquid in the container, a source of electrical supply, a substantially spherical float composed of metallized insulating material located within said guide structure and arranged to rise and fall freely with the liquid level, a wire-wound resistance element mounted to extend continuously along one side of said guide structure between the highest and lowest levels to be indicated, an electrical indicating instrument arranged to be connected in circuit with said source of supply and at least part of said resistance element through said float, and means for moving said float laterally across the surface of the liquid in said guide structure, when a reading is to be taken, so that said float effects completion of the circuit of said indicating instrument, the amount of said resistance element which is included in said circuit being governed by the position of said float and consequently by the level of the liquid.

3. An apparatus for indicating the level of liquid in a container, comprising a guide structure arranged to extend within the container between the highest and lowest levels to be indicated, with at least the lower end of said guide structure open to the liquid in the container, a float consisting of a hollow sphere of metal located within said guide structure and arranged to rise and fall freely with the liquid level, a source of electrical supply, a wire-wound resistor mounted to extend vertically along one side of the interior of said guide structure, said metal float being capable of making electrical contact with the turns of said resistor, an electrical indicating instrument arranged to be connected in circuit with said source of supply through at least part of said resistor, and means for moving said float laterally across the surface of the liquid in said guide structure, when a reading is to be taken, so that said float makes electrical contact with said resistor and thereby effects completion of the circuit of said indicating instrument, the amount of said resistor which is included in said circuit being governed by the position of said float and consequently by the level of the liquid.

4. An apparatus for indicating the level of liquid in a container, comprising a hollow guide structure of elongated cross-section mounted within the container so as to extend between the highest and lowest levels to be indicated, the bottom of said guide structure having a relatively small opening therein to afford the liquid in the container free access to the interior of said guide structure, a source of electrical supply, a substantially spherical electrically-conductive float located within said guide structure and arranged to rise and fall freely with the liquid level, a wire-wound resistor mounted within said guide structure to extend vertically at one side thereof, an electrical indicating instrument arranged to be connected in circuit with said source of supply and at least part of said resistor through the path provided by said float, an electrically-conductive striker pivotally mounted to extend vertically within said guide structure at the side thereof opposite to that at which said resistor is located, said striker being connected in circuit with said indicating instrument, and means to effect pivotal movement of said striker whereby said float is moved laterally across the surface of the liquid in said guide structure into electrical contact with said resistor, so that said float acts as a switch to effect completion of the circuit of said indicating instrument, the amount of said resistor which is included in said circuit being governed by the position of said float and consequently by the level of the liquid.

5. A gauge for indicating the level of liquid in a container, comprising a tubular guide cage adapted to extend between the highest and lowest levels to be indicated, with at least the lower end of said guide cage admitting access of liquid in the container, an electrically-conductive ball float mounted for vertical movement within said guide cage to rise and fall freely with the liquid level, a wire-wound resistor mounted adjacent and parallel with the path of movement of said float during the upward and downward movement thereof, a pair of electrical terminals, one connected to an end of said resistor, and means for moving said float into contact with said resistor, when a reading is to be taken, and thereby to cause said float to tap off and connect between said terminals a portion of the resistance of said resistor governed by the position of said float and consequently by the level of the liquid.

6. An apparatus for indicating the level of liquid in a container, comprising a hollow guide structure mounted to extend within said container between the highest and lowest levels to be indicated, the bottom end of said container having an opening therein to afford the liquid in the container free access to the interior of said guide structure, an electrically-conductive ball float located within said guide structure and arranged to rise and fall freely with the liquid level, a source of electrical supply, a wire-wound resistor mounted to extend vertically within said guide structure adjacent one side thereof, a ratiometer ohmmeter arranged to be connected in circuit with said source of supply and said resistor, and means for moving said float laterally in said guide structure and into engagement with said resistor, whereby an amount of said resistor corresponding to the liquid level is tapped off by said float and is included in the circuit of said ohmmeter.

7. An apparatus for indicating the level of liquid in a container, comprising a hollow guide structure mounted to extend within said container between the highest and lowest levels to be indicated, the lower end of said guide structure having an opening therein to afford the liquid in the container free access to the interior of said guide structure, an electrically-conductive ball float located within said guide structure and arranged to rise and fall freely with the liquid level, a source of electrical supply, a wire-wound resistor mounted to extend vertically within said guide structure adjacent one side thereof, an electrical indicating instrument arranged to be connected in circuit with said source of supply and said resistor, a movably mounted electrically-conductive member extending within said guide structure adjacent the side thereof opposite to that at which said resistor is located, said member being connected in circuit with said indicating instrument and being normally in an inoperative position, and means for displacing said member from its inoperative position to cause said float to move laterally in said guide structure and into electrical contact with said resistor, whereby an amount of said resistor corresponding to the liquid level is tapped off by said float and is included in the circuit of said indicating instrument.

8. An apparatus for indicating the level of liquid in a container, comprising a hollow guide structure mounted to extend within said container between the highest and lowest levels to be indicated, the bottom end of said container having an opening therein to afford the liquid in the container free access to the interior of said guide structure, an electrically-conductive ball float located within said guide structure and arranged to rise and fall freely with the liquid level, a source of electrical supply, a wire-wound resistor mounted to extend vertically within said guide structure adjacent one side thereof, an electrical indicating instrument arranged to be connected in circuit with said source of supply and said resistor, a movably mounted electrically-conductive member extending within said guide structure adjacent the side thereof opposite to that at which said resistor is located, said member being connected in circuit with said indicating instrument and being normally in an inoperative position, an electromagnet co-operating with said member, and means for energising said electromagnet so that said member is displaced from its inoperative position to cause said float to move laterally in said guide structure and into electrical contact with said resistor, whereby an amount of said resistor corresponding to the liquid level is tapped off by said float and is included in the circuit of said indicating instrument.

9. An apparatus for indicating the level of liquid in a container, comprising a hollow guide structure arranged to extend within the container between the highest and lowest levels to be indicated, at least the lower end of said guide structure being open to the liquid in the container, a ball float located within said guide structure and arranged to rise and fall freely with the liquid level, a source of electrical supply, a resistor mounted to extend vertically within said guide structure between the highest and lowest levels to be indicated, one end of said resistor being left unconnected, an electrical indicating instrument arranged to be connected in circuit with said source of supply through at least part of said resistor, and a striker pivotally mounted to extend vertically within said guide structure on the side of said float opposite to that at which said resistor is located, electro-magnetic means for operating said striker, operation of said striker causing said float to move laterally within said guide structure into engagement with said resistor, whereby the circuit of said indicating instrument is completed through a portion of said resistor governed by the position of said float and consequently by the level of the liquid.

10. An apparatus for indicating the level of liquid in a container, comprising a hollow guide structure mounted within said container to extend between the highest and lowest levels to be indicated and having an opening in the lower end thereof to afford the liquid in the container free access to the interior of said guide structure, an electrically-conductive ball float mounted within said guide structure to rise and fall freely with the liquid level, a vertical support mounted within said container, a resistor mounted parallel with said support, an actuator, a pair of links pivoted to said support and said actuator to permit of parallel movement of said actuator into contact with said float, and means for moving said actuator, when a reading is to be taken, into contact with said float to cause said float to make electrical contact with said resistor.

11. An apparatus for indicating the level of liquid in a container, comprising a guide structure arranged to extend within the container between the highest and lowest levels to be indicated, a float guided by said guide structure only substantially at the level of the liquid surface and arranged to rise and fall freely with the liquid level, a resistor mounted adjacent and parallel to the path of movement of said float resulting from a change in the liquid level, a source of electrical supply, an indicating instrument, a connection from one end of said resistor to include said source of supply and said indicating instrument, clamping means operative when a reading is to be taken to clamp said float against said resistor substantially at the level of the liquid surface, and means operative upon the actuation of said clamping means to complete the circuit to said source and said indicating instrument through a portion of said resistor corresponding to the level of the liquid in said container.

12. An apparatus for indicating the level of liquid in a container, comprising a guide structure arranged to extend within the container between the highest and lowest levels to be indicated, with at least the lower end of said guide structure open to the liquid in the container, a float located within said guide structure so as to co-operate therewith only substantially at the level of the liquid surface and arranged to rise and fall freely with the liquid level, a resistor mounted adjacent and parallel to the path of movement of said float resulting from a change in the liquid level, a source of electrical supply, an indicating instrument, a connection from one end of said resistor to include said source of supply and said indicating instrument, clamping means operative when a reading is to be taken to clamp said float against said resistor substantially at the level of the liquid surface, and means operative upon the actuation of said clamping means to complete the circuit to said source and said indicating instrument through a portion of said resistor corresponding to the level of the liquid in said container.

13. An apparatus for indicating the level of liquid in a container comprising a guide structure arranged to extend within the container between the highest and lowest levels to be indicated, a float guided by said guide structure only substantially at the level of the liquid surface, and arranged to rise and fall freely with the liquid level, a source of electrical supply, an indicating instrument, a row of spaced contact elements arranged parallel with the path of travel of said float, said contact elements having electrical connection with different points in a resistor, a connection from one end of said resistor to include said source of supply and said indicating instrument, means for moving said float laterally across the surface of the liquid into engagement with said row of contact elements substantially at the level of the liquid surface when a reading is to be taken, and means rendered operative by engagement of said float in contact with one of said contact elements for completing a circuit through said source and indicating instrument, to a predetermined point in said resistor corresponding to the level of the liquid in said container.

14. An apparatus for indicating the level of liquid in a container comprising a guide structure arranged to extend within the container between the highest and lowest levels to be indicated, a float guided by said guide structure only substantially at the level of the liquid surface, and arranged to rise and fall freely with the liquid level, a source of electrical supply, an indicating instrument, a resistance path, including contact means providing a plurality of points of electrical contact at spaced points on said resistance path, said contact means being arranged in a row parallel with the path of travel of said float, a connection from one end of said resistance path to include said source of supply and said indicating instrument, means for moving said float laterally across the surface of the liquid into engagement with said row of contact means substantially at the level of the liquid surface when a reading is to be taken, and means rendered operative by engagement of said float in contact with one of said contact means for completing a circuit through said source and indicating instrument, to a predetermined point in said resistance path corresponding to the level of the liquid in said container

WILLIAM THOMAS MARCHMENT.